US008977684B2

(12) United States Patent
Alexandrov et al.

(10) Patent No.: US 8,977,684 B2
(45) Date of Patent: *Mar. 10, 2015

(54) SYSTEMS AND METHODS FOR COMPUTER AND VOICE CONFERENCE AUDIO TRANSMISSION DURING CONFERENCE CALL VIA VOIP DEVICE

(75) Inventors: Albert Alexandrov, Goleta, CA (US); Florian Winterstein, Santa Barbara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 205 days.

This patent is subject to a terminal disclaimer.

(21) Appl. No.: 12/423,451

(22) Filed: Apr. 14, 2009

(65) Prior Publication Data

US 2010/0262656 A1 Oct. 14, 2010

(51) Int. Cl.
*G06F 15/16* (2006.01)
*H04M 3/56* (2006.01)
*H04M 7/00* (2006.01)
*H04M 9/08* (2006.01)

(52) U.S. Cl.
CPC ............ *H04M 3/567* (2013.01); *H04M 7/0027* (2013.01); *H04M 9/082* (2013.01)
USPC .......................................... 709/204; 709/205

(58) Field of Classification Search
USPC ................................................. 709/204, 205
See application file for complete search history.

(56) References Cited

U.S. PATENT DOCUMENTS

| | | |
|---|---|---|
| 5,553,083 A | 9/1996 | Miller |
| 5,727,002 A | 3/1998 | Miller |
| 5,764,235 A | 6/1998 | Hunt et al. |
| 5,826,025 A | 10/1998 | Gramlich |
| 5,845,265 A | 12/1998 | Woolston |
| 5,854,893 A * | 12/1998 | Ludwig et al. ................ 709/204 |
| 5,956,027 A | 9/1999 | Krishnamurthy |
| 6,081,829 A | 6/2000 | Sidana |
| 6,167,432 A | 12/2000 | Jiang |
| 6,246,758 B1 | 6/2001 | Low |
| 6,249,291 B1 | 6/2001 | Popp et al. |
| 6,343,313 B1 | 1/2002 | Salesky et al. |

(Continued)

FOREIGN PATENT DOCUMENTS

| | | | |
|---|---|---|---|
| EP | 1718103 A1 | 11/2006 | ............... H04R 3/02 |
| WO | WO 2008/036950 A2 | 3/2008 | ............ H04M 1/725 |

OTHER PUBLICATIONS

Acoustic Echo Control Considerations for Video Teleconferencing; C.S. Ravishankar and M. Onufry; pp. 161-189; Jan. 1, 1994.

(Continued)

*Primary Examiner* — Minh-Chau Nguyen
(74) *Attorney, Agent, or Firm* — BainwoodHuang (57) ABSTRACT

A new approach is proposed that contemplates systems and methods to support canceling audio streams leaked from a speaker to a microphone so that a clean audio stream of a presenter or viewer speaking at a conference call is transmitted. Here, the audio streams being canceled includes the computer audio stream of an application being run or a material being presented online during a web conference and/or the audio stream received from the rest of the group of participants at the conference call. The computer audio stream is then transmitted in addition to the presenter or viewer audio stream, and separate from any other audio stream captured by the hosting device during the conference call.

12 Claims, 9 Drawing Sheets

(56) References Cited

U.S. PATENT DOCUMENTS

| | | | |
|---|---|---|---|
| 6,646,997 B1* | 11/2003 | Baxley et al. | 370/260 |
| 7,007,098 B1* | 2/2006 | Smyth et al. | 709/233 |
| 7,013,327 B1 | 3/2006 | Hickman et al. | |
| 7,197,535 B2 | 3/2007 | Salesky et al. | |
| 7,310,675 B2 | 12/2007 | Salesky et al. | |
| 7,369,515 B2 | 5/2008 | Salesky et al. | |
| 7,412,482 B2* | 8/2008 | Ludwig et al. | 709/204 |
| 7,418,476 B2 | 8/2008 | Salesky et al. | |
| 7,426,191 B2 | 9/2008 | Salesky et al. | |
| 7,454,342 B2* | 11/2008 | Nefian et al. | 704/256 |
| 7,539,083 B2* | 5/2009 | Blackmon et al. | 367/198 |
| 7,593,987 B2 | 9/2009 | Salesky et al. | |
| 7,627,663 B2 | 12/2009 | Salesky et al. | |
| 7,715,331 B2 | 5/2010 | Salesky et al. | |
| 7,716,344 B2 | 5/2010 | Salesky et al. | |
| 7,724,885 B2* | 5/2010 | Jarske et al. | 379/202.01 |
| 7,813,304 B2 | 10/2010 | Salesky et al. | |
| 7,822,859 B2 | 10/2010 | Salesky et al. | |
| 7,836,163 B2 | 11/2010 | Salesky et al. | |
| 7,877,489 B2 | 1/2011 | Salesky et al. | |
| 7,929,012 B2* | 4/2011 | Fry et al. | 348/14.09 |
| 7,934,002 B2 | 4/2011 | Salesky et al. | |
| 2002/0112004 A1 | 8/2002 | Reid et al. | |
| 2002/0188731 A1* | 12/2002 | Potekhin et al. | 709/227 |
| 2003/0059061 A1* | 3/2003 | Tsuji et al. | 381/92 |
| 2003/0140159 A1 | 7/2003 | Campbell | |
| 2005/0060368 A1* | 3/2005 | Wang et al. | 709/204 |
| 2006/0277254 A1* | 12/2006 | Kenoyer et al. | 709/204 |
| 2007/0041366 A1 | 2/2007 | Vugenfirer et al. | |
| 2008/0160977 A1* | 7/2008 | Ahmaniemi et al. | 709/204 |
| 2009/0202063 A1* | 8/2009 | Frauenthal et al. | 379/406.16 |
| 2010/0279266 A1 | 11/2010 | Laine et al. | |
| 2010/0306674 A1 | 12/2010 | Salesky et al. | |

OTHER PUBLICATIONS

"CU-SeeMe Software Product," Brought to you by the Cu-SeeMe Development Team of the Advanced Technologies and Planning group of the Network Resources Division of Cornell Information Technologies, pp. 1-8 (1995).

"ORCA Video Conferencing System", Manual Written by the National Oceanic and Atmospheric Administration's Office of Ocean Resources Conservation and Assessment for Operation of the CU-SeeMe System, 26 pages (1995).

Abdel-Waha et al., "XTV: A Framework for Sharing X Window Clients in Remote Synchronous Collaboration," IEEE Conference, pp. 1-15 (1991).

Chen et al., "Real Time Video and Audio in the World Wide Web", 1995.

Bolot et al., "Scalable Feedback Control for Multicast Video Distribution in the Internet," SIGCOMM 94, London England, pp. 58-67 (1994).

Cox, "Global Schoolhouse Project," http://www.virtualschool.edu/mon/academia (2010).

Crowley et al., "MMConf: An Infrastructure for Building Shared Multimedia Applications," Proceedings of the 1990 ACM Conference on Computer—Supported Cooperative Work, pp. 329-342 (1990).

Delgrossi et al., "Media Scaling for Audiovisual Communication with the Heidelberg Transport System," Conference Proceedings of the first ACM International Conference on Multimedia, pages pp. 99-104 (1993).

Dorcey, "CU-SeeMe Desktop Videoconferencing Software," Connexions The Interoperability Report, 9: 42-45 (1995).

Ensor et al., "Control Issues in Multimedia Conferencing," IEEE Conference, pp. 133-143 (1991).

Ensor et al., "The Rapport Multimedia Conferencing System—A Software Overview," Proceedings of the 2nd IEEE Conference, pp. 52-58 (1988).

Maly et al., "Mosaic + XTV = CoReview," Computer Networks and ISDN Systems, pp. 1-19 1995.

McCanne et al., "Receiver-Driven Layered Multicast," ACM SIGCOMM, pp. 1-14 (1996).

Sattler, "Internet TV with CU-SeeMe", Book, 323 pages (1995).

Savetz et al., "MBONE: Multicasting Tomorrow's Internet," IDG Books Worldwide, Inc., (1996).

U.S. Appl. No. 09/523,315, filed Mar. 10, 2000, Salesky.
U.S. Appl. No. 60/014,242, filed Mar. 26, 1996, Salesky.
US 5,715,404, 02/1998, Katseff et al. (withdrawn)

* cited by examiner

SYSTEMS AND METHODS FOR COMPUTER AND VOICE CONFERENCE AUDIO TRANSMISSION DURING CONFERENCE CALL VIA VOIP DEVICE

RELATED APPLICATIONS

This application is related to U.S. patent application Ser. No. 12/423,467, filed concurrently and entitled "Systems and methods for computer and voice conference audio transmission during conference call via PSTN phone," by Albert Alexandrov et al. and is hereby incorporated by reference herein.

BACKGROUND

A conference call is a telephone call between two or more callers or users (referred to herein as a group of participants) at geographically distributed locations, which allows each participant to be able to speak to, and listen to, other participant(s) simultaneously. A conference call among a plurality of participants can be conducted via a voice conference bridge or centralized server, which connects numerous end-point devices (VoIP devices or PSTN telephones) associated with the participants using appropriate communication protocols and mixes the various incoming voice streams from the plurality of participants either at the endpoint devices or at the conference bridge.

A Web conferencing tool enables the group of participants to organize and attend meetings online during a conference call by allowing a presenter in the group of the participants at the conference call to run a computer software application (also referred to herein as the application) or to present a material via a hosting device and share the application or material with the rest of the group (the viewers) to view in real time. For non-limiting examples, such Web conferencing tool enables the presenter to perform live demonstrations in real time, collaborate documents with colleagues, and provide training to customers and employees.

During the Web conferencing, an outgoing audio stream of the material being presented and/or the application being run via the hosting device (also referred to herein as the computer audio) may often need to be transmitted to the conference in addition to, and in separation from, an outgoing voice conference audio stream of the presenter or viewer speaking at the conference call (also referred to herein as the presenter or viewer audio, respectively). In the meantime, an incoming voice audio stream needs to be received from the rest of the group speaking at the conference call (also referred to herein as the voice conference audio). When there are more than one person need to listen to and/or to speak at the conference call at the same location as the presenter or the viewer, the presenter or viewer may have to "open up" the conference call by using a separate speaker and a microphone associated with the hosting device instead of an integrated headset w/ microphone attached his/her head. Consequently, the computer audio may leak from the speaker to the microphone together with the presenter or viewer audio, causing deterioration in the audio quality of the conference call. Conversely, it is important to make sure that the two outgoing audio streams— the computer audio and the presenter or viewer audio are transmitted separately by the hosting device without interfering with one another.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

FIG. 6($a$)-($c$) depict various examples of diagrams of a system on the viewer side of FIG. 1 to support canceling computer audio from voice conference audio of a viewer conferencing through a hosting device.

DETAILED DESCRIPTION OF EMBODIMENTS

The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

A new approach is proposed that contemplates systems and methods to support canceling audio streams leaked from a speaker to a microphone so that a clean audio stream of a presenter or viewer speaking at a conference call (presenter or viewer audio) is transmitted. Here, the audio streams being canceled includes the computer audio stream of an application being run or a material being presented (computer audio) during a web conference and/or the audio stream received from the rest of the group of participants at the conference call (voice conference audio). The computer audio stream is then transmitted in addition to the presenter or viewer audio stream, and separate from any other audio stream captured by the hosting device during the conference call. Such an approach enables "clean" transmission of both the computer audio and the presenter/viewer audio without mixing of echoes or feedbacks from other sources during the conference at which open speakers and microphones are used (in place of an integrated headset) and multiple audio streams are captured, leaked into, or mixed with one another.

As used herein, "canceling" or "cancellation" means suppressing and removing with the best effort from one audio stream the echo and feedback of another. The resulting audio stream after such cancellation effort is considered as "clean" even if certain residue of the echo and feedback may possibly remain in the audio stream.

Figure 1:
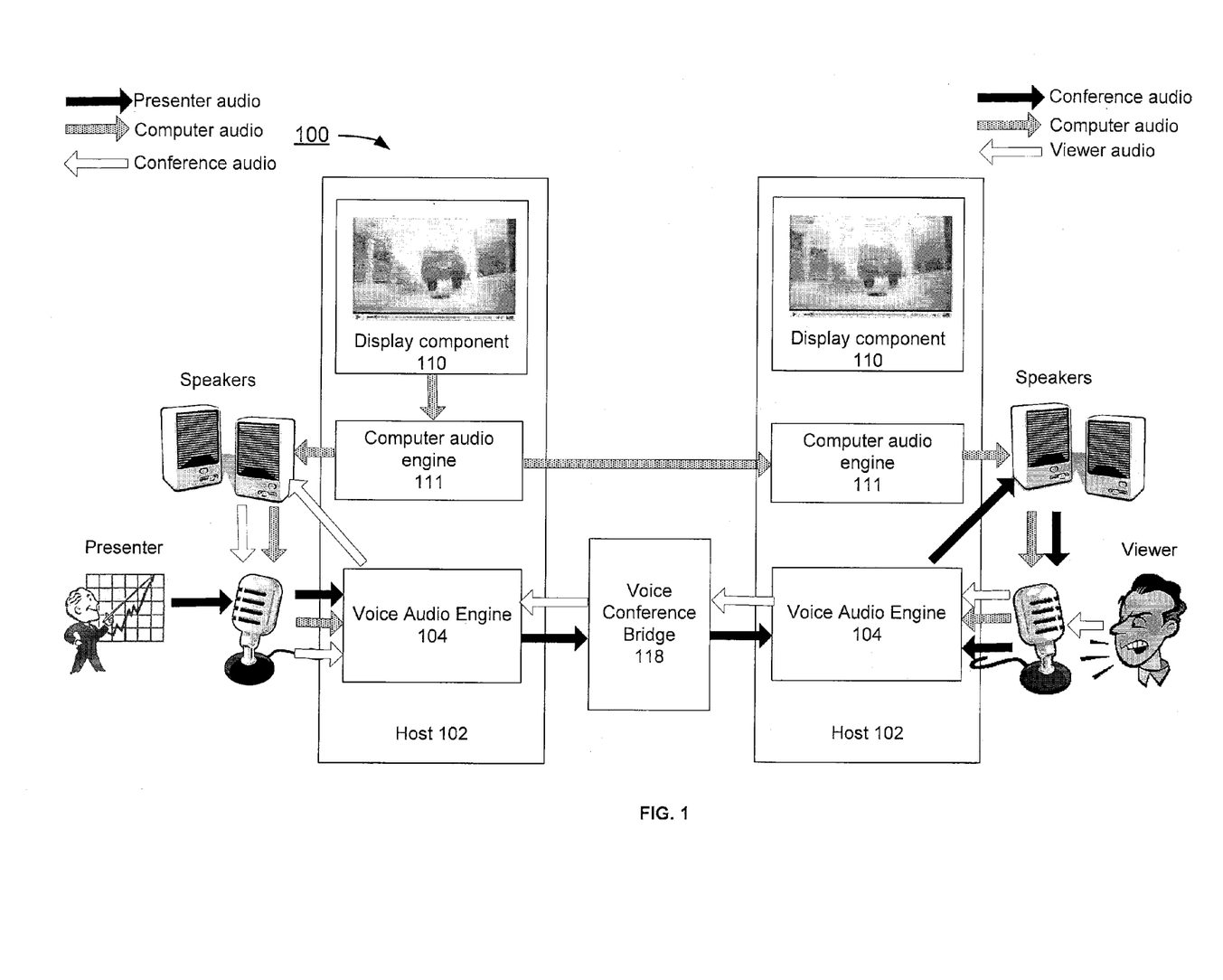
FIG. 1 depicts an example of a diagram of system to support clean transmission of computer audio as well as voice conference audios between a presenter and a viewer conferencing through VoIP hosting devices.

FIG. 1 depicts an example of a diagram of system 100 to support clean transmission of computer audio as well as voice conference audios between a presenter and a viewer conferencing through hosting devices. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks. Although both the presenter and the viewer conference via their respective VoIP devices, it will be apparent to one skilled in the art to enable either of them to use an PSTN phone instead under the teaching of the US application entitled "System and methods for computer and voice conference audio transmission during conference call via PSTN phone," filed concurrently and incorporated by reference.

In the example of FIG. 1, the system 100 includes hosts (hosting devices) 102 deployed for each of a presenter and a viewer at a conference call, wherein various components running on each host 102 include at least a voice audio engine 104, an optional display component 110, and a computer audio engine 111; and a voice conference bridge 118 running on a separate host.

As used herein, the term "engine", "component", or "bridge" refers to a software, firmware, hardware, or other component that is used to effectuate a purpose. The engine, component, or bridge will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

In the example of FIG. 1, the host 102 can be a computing device, a communication device, a storage device, or any electronic device capable of running a software component. For non-limiting examples, a computing device can be but is not limited to, a laptop PC, a desktop PC, a tablet PC, an iPod, a PDA, or a server machine. A storage device can be but is not limited to a hard disk drive, a flash memory drive, or any portable storage device. A communication device can be but is not limited to a mobile phone.

In the example of FIG. 1, the voice audio engine 104 is a software subsystem for bidirectional communication of audio streams of data to simulate a (PSTN) telephone. The voice audio engine 104 is typically used as an embedded system on the host 102 using voice over internet protocol (VoIP) technology, while handles voice processing on a standard processor of the host 102, compared to systems which required dedicated, math-optimized digital signal processor chips. The voice audio engine 104 can be an optimized software subsystems with mathematically complex signal processing required for voice filtering and speech coding as understood by one ordinarily skilled in the relevant art.

In the example of FIG. 1, the optional display component 110 enables the presenter to display, manipulate, and share an application he/she runs or a material he/she presents at the conference call and the viewer to hear or view the application run or material presented by the presenter. Here, the display component 110 can be a monitor, a screen, or any other displaying device associated with the host 102 known to one skilled in the art. The application or material can be any type of digital document, application, or program that produces sound and/or displayable on the display component 110 of the host 102, including the entire displayable desktop of the host 102.

In the example of FIG. 1, the computer audio engine 111 is a software component that utilizes one or more sound capturing devices of the host 102, such as a sound card or on the host 102, a separate physical device of a microphone and/or a speaker, to capture and/or to playback audio streams by invoking Application Programming Interfaces (APIs) to the sound capturing devices, such as the Window APIs.

In the example of FIG. 1, the voice conference bridge 118 is operable to provide conferencing services over a communication network by establishing a conference call among a group of participants including at least a presenter and one or more viewers, receiving and mixing communication (voice, video, and/or data) signals generated by each of the group of participants, and providing the mixed signals to each of the group of participants. Here, each of the group of participants is able to both simultaneously listen to and to speak to the rest of the participants in the group while listening and/or watching the application run or material presented on the display component 110 of the host 102 during the conference call. Here, each of the group of participants may represent a group of people gathering at a geographically distributed location, such as a conference room or office, where everyone in the group can listen to or speak to the conference call via a telephony endpoint device.

In the example of FIG. 1, the hosts 102 and the voice conference bridge 118 can communicate and interact with each other via communication interfaces (not shown) following certain communication protocols, such as TCP/IP protocol, over a network (not shown). Here, the network can be a communication network based on certain communication protocols, such as TCP/IP protocol. Such network can be but is not limited to, internet, intranet, wide area network (WAN), local area network (LAN), wireless network, Bluetooth, WiFi, and mobile communication network. The physical connections of the network and the communication protocols are well known to those of skill in the art.

While the system 100 depicted in FIG. 1 is in operation, the first host 102 is associated with a presenter during a conference call, where the optional display component 110 of the first host enables the presenter to display, manipulate, and share a presentation material or an application at the conference call. While the application is being run and/or the material is being presented, a computer audio engine 111 of the first host 102 provides an audio stream of the application or material to one or more speakers and transmits a clean computer audio stream to a viewer at the conference call with all other audio streams (e.g., echoes and feedback noises) canceled. During the conference call, a voice audio engine 104 running on the first host enables the presenter to listen to an voice audio stream from the rest of the conference by feeding the incoming voice conference audio to the speakers, and to speak an audio stream of him/herself at the conference call via a microphone associated with the first host 102. More importantly, the voice audio engine 104 transmits a clean outgoing presenter audio to the voice conference bridge 118 hosting the conference call with all other audio streams (e.g., echoes and noises leaked through the microphone) canceled. Correspondingly, the second host 102 is associated with a viewer during the conference call, where an optional display component 110 of the second host receives and displays the presentation material or application originated by the presenter to the viewer at the conference call. While the application is being run or the material is being presented to the viewer, a computer audio engine 111 of the second host accepts the incoming computer audio for the viewer to listen to and feeds the computer audio to one or more speakers at the second host 102. In the meantime, a voice audio engine 104 running on the second host enables the viewer to listen to the presenter audio by feeding the audio stream to the speakers, and to speak a voice audio stream of him/herself at the conference call via a microphone associated with the second host 102. As does the voice audio engine 104 on the first host, the voice audio engine 104 on the second host also transmits a clean outgoing viewer audio to the voice conference bridge 118 hosting the conference call with all other audio streams (e.g., echoes and noises leaked through the microphone) canceled. During the conference call, the voice conference bridge 118 accepts, processes, and transmits the voice audio streams between the presenter and the viewer.

Figure 2:
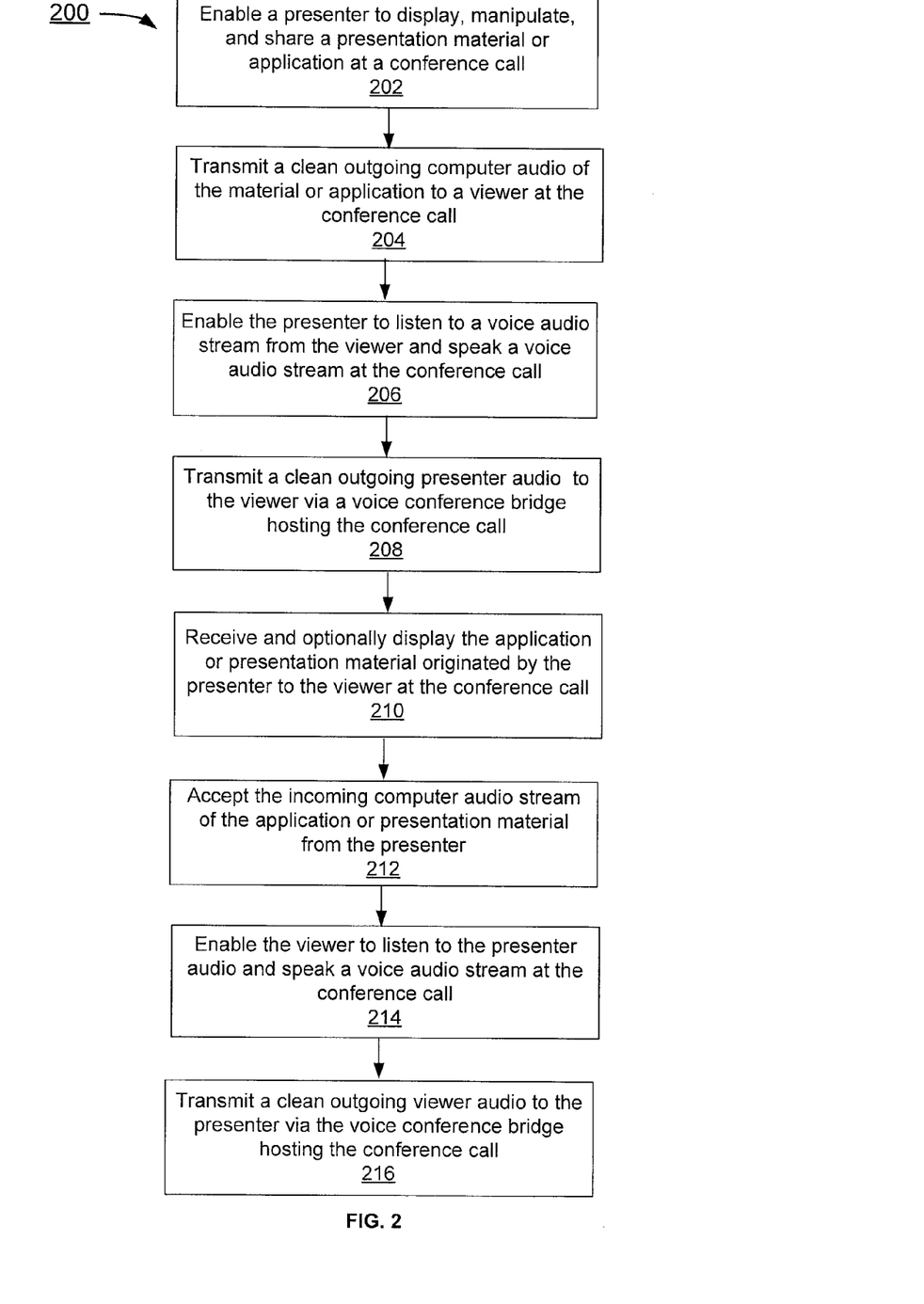
FIG. 2 depicts a flowchart of an example of a process to support clean transmission of computer audio as well as voice conference audios between a presenter and a viewer conferencing through a hosting device.

FIG. 2 depicts a flowchart of an example of a process to support clean transmission of computer audio as well as voice conference audios between a presenter and a viewer conferencing through a hosting device. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202 where a presenter is enabled to display, manipulate, and share a presentation material or application at a conference call. The flowchart 200 continues to block 204 where a clean outgoing computer audio stream of the application or presentation material is transmitted to a viewer at the conference call. The flowchart 200 continues to block 206 where the presenter is enabled to listen to a voice audio stream from the viewer and speak a voice audio stream of him/herself at the conference call. The flowchart 200 continues to block 208 where a clean outgoing presenter audio is transmitted to the viewer via a voice conference bridge hosting the conference call. The flowchart 200 continues to block 210 where the application or the presentation material originated by the presenter is received and optionally displayed to the viewer at the conference call. The flowchart 200 continues to block 212 where the incoming computer audio stream of the application or presentation material from the presenter is accepted by the viewer. The flowchart 200 continues to block 214 where the viewer is enabled to listen to the presenter audio and speak the voice audio stream of him/herself at the conference call. The flowchart 200 ends at block 216 where a clean outgoing viewer audio is transmitted to the presenter via the voice conference bridge hosting the conference call.

VoIP Conferencing—Presenter Side

Figure 3:
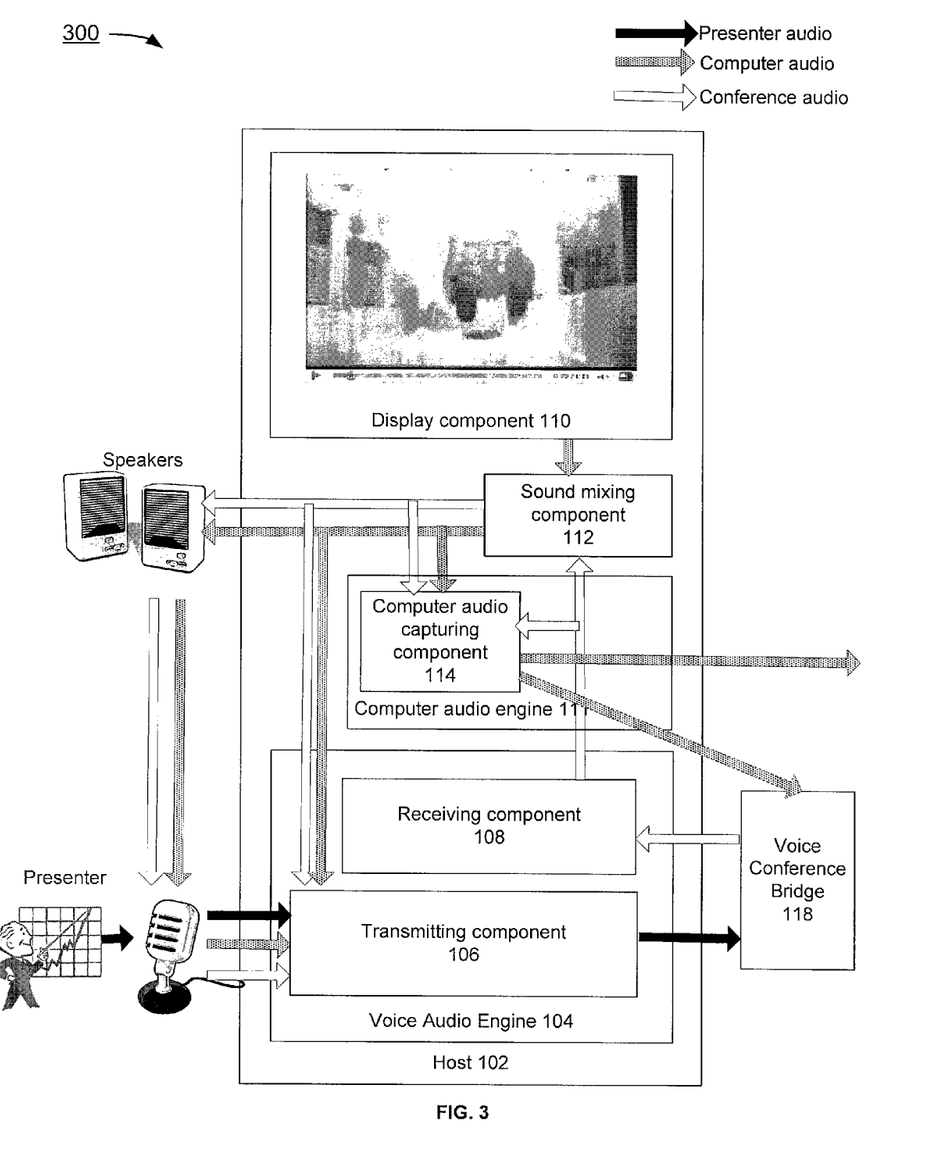
FIG. 3 depicts an example of a diagram of system on the presenter side of FIG. 1 to support canceling computer audio from audio of a presenter conferencing through a hosting device and vise versa.

FIG. 3 depicts an example of a diagram of system 300 on the presenter side of FIG. 1 to support canceling computer audio from voice audio of the presenter conferencing through a (VoIP) hosting device and vise versa. In the example of FIG. 3, the system 300 includes host (hosting device) 102, and various components running on the host 102 as depicted in FIG. 1 as well as a sound mixing component 112. In addition, the voice audio engine 104 further includes at least a transmitting component 106 and a receiving component 108, and the computer audio engine 111 further includes a computer audio capturing component 114, and/or a computer audio playback component 116 (shown in FIG. 6(a)-(b)). As used herein, the term "component" refers to a software, firmware, hardware, or other component that is used to effectuate a purpose.

In the example of FIG. 3, the transmitting component 106 of the voice audio engine 104 accepts (receives, collects, or captures) one or more voice audio streams of the presenter (presenter audio) speaking from an audio input device such as a microphone as well as from other components running on the host 102, such as the sound mixing component 112. It then processes and transmits the presenter audio to the voice conference bridge 118. Conversely, the receiving component 108 of the voice audio engine 104 accepts one or more voice audio streams of the conference call (conference audio) from the voice conference bridge 118. It then processes and provides the conference audio to other components running on the host 102 such as the sound mixing component 112 and/or the computer audio capturing component 114 of the computer audio engine 111.

In the example of FIG. 3, the sound mixing component 112 is a software component that utilizes one or more sound capturing devices of the host 102, such as a sound card of the host 102, by invoking interfaces to the sound capturing devices. More specifically, the sound mixing component 112 mixes all audio streams that have been either originated or accepted by an application, program, or interface running on the host 102, such as the computer audio and/or the conference audio, and outputs the mixed audio streams to an audio output device such as a headphone or a speaker as shown in FIG. 3. In addition, it may also provide the mixed audio streams to other components, such as the transmitting component 106 of the voice audio engine 104 and/or the computer audio capturing component 114 of the computer audio engine 111 via respective APIs.

In the example of FIG. 3, the computer audio capturing component 114 of the computer audio engine 111 is a software component that captures audio streams from the output of the sound mixing component 112 and/or from another audio generating source running on the host 102, such as the receiving component 108 of the voice audio engine 108. In addition, the computer audio capturing component 114 process the audio streams it captures, and outputs the processed audio stream to an output channel/device or alternatively to the same voice conference bridge 118 as shown by the dotted arrow in FIG. 3.

While the system 300 depicted in FIG. 3 is in operation, the voice audio engine 104 running on the host 102 enables a presenter to listen to a conference call hosted by a voice conference bridge 118 via a speaker (so that other people at the same location can listen in) and speaks to the conference call via a microphone. The display component 110 of the host 102 enables the presenter to display, manipulate, and share an application or presentation material, which can be but is not limited to, a video, a slide, a graph, a piece of data, and a document, at a conference call. During the conference call, the sound mixing component 112 of the host 102 captures and mixes both the computer audio, such as a sound of the video played by the host 102, and a conference audio from rest of the group of the participants at the conference call from the receiving component 108 of the voice audio engine 104, which accepts and outputs the audio stream from a voice conference bridge hosting the conference call. The sound mixing component 112 then outputs the mix of the conference audio and the computer audio to the speaker so that the presenter can hear the rest of the group of the participants at the conference call. In addition, the sound mixing component 112 also provides the mix of the conference audio and the computer audio to the transmitting component 106 of the voice audio engine 104 via, for a non-limiting example, APIs, for processing of the voice audio streams captured from the microphone. The transmitting component 106 of the voice audio engine 104 captures via the microphone not only the presenter audio but also the mix of the conference audio and the computer audio leaked from the speaker through the microphone, which is undesirable. The transmitting component 106 then captures from output of the sound mixing component 112 the mix of the conference audio and the computer audio and cancels the mix from the one or more audio streams captured by the microphone so that only the presenter audio will be transmitted to the voice conference bridge 118 hosting the conference call without the feedback noise of the leaked conference audio and/or the computer audio. Alternatively, the transmitting component 106 can transmit the captured mix of the presenter audio and the computer audio to the voice conference bridge 118, which will then cancel the computer audio it received from computer audio capturing component 114 from the mix of the presenter audio and the computer audio before transmitting the presenter audio to the viewer.

Figure 4:
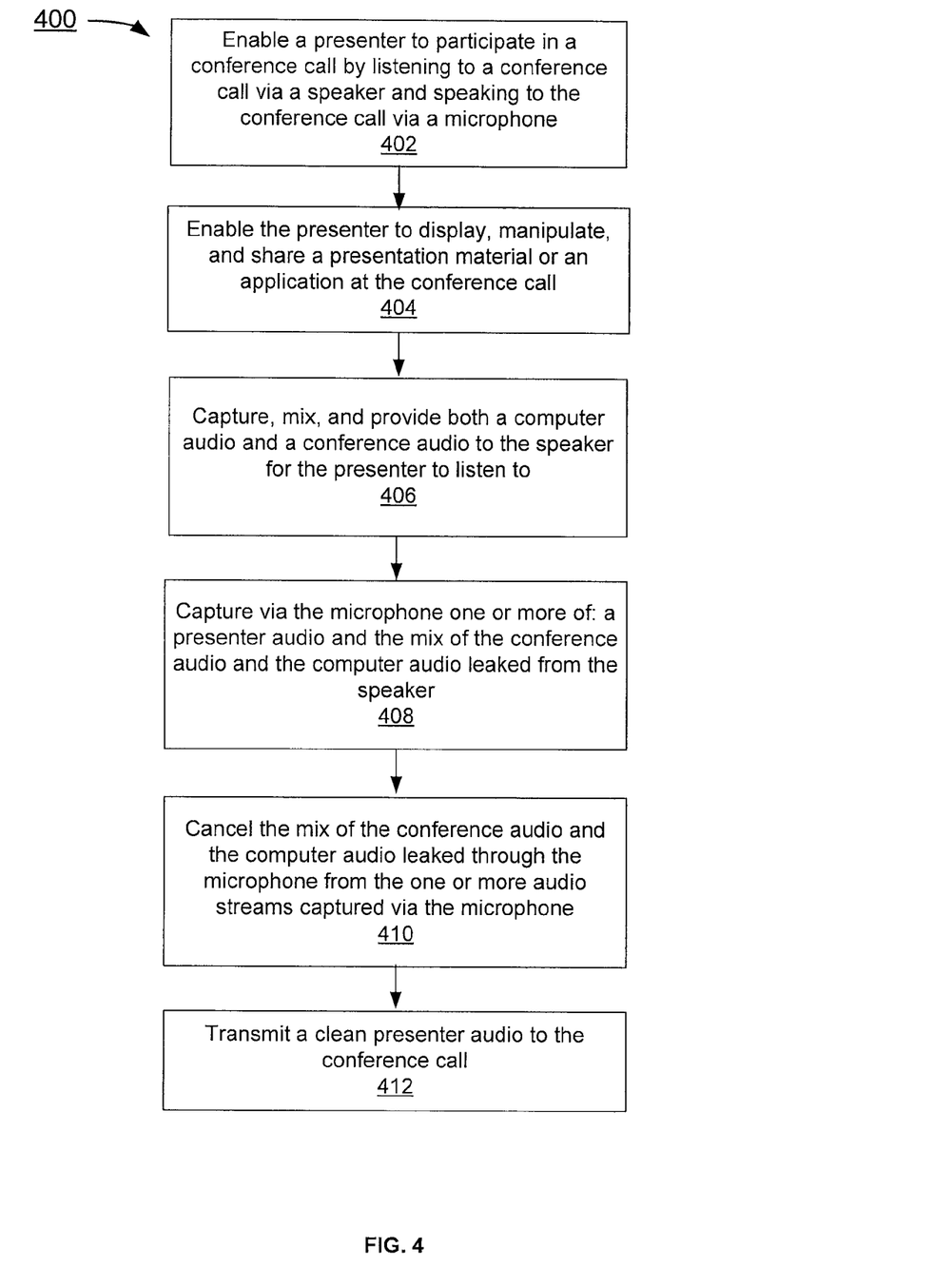
FIG. 4 depicts a flowchart of an example of a process to support canceling computer and/or voice conference audio from voice audio of a presenter conferencing through a hosting device.

FIG. 4 depicts a flowchart of an example of a process to support canceling computer and/or conference audio from voice audio of a presenter conferencing through a (VoIP) hosting device. In the example of FIG. 4, the flowchart 400 starts at block 402 where a presenter is enabled to participate in a conference call by listening to the conference call via a speaker and speaking to the conference call via a microphone. The flowchart 400 continues to block 404 where the presenter is enabled to display, manipulate, and share a presentation material or an application at the conference call. The flowchart 400 continues to block 406 where both a computer audio and a voice conference audio are captured, mixed, and output to the speaker for the presenter to listen to. The flowchart 400 continues to block 408 where one or more of: a presenter audio and the mix of the conference audio and the computer audio leaked from the speaker are captured via the microphone. The flowchart 400 continues to block 410 where the mix of the conference audio and the computer audio leaked through the microphone is canceled from the one or more audio streams captured by the microphone. The flowchart 400 ends at block 412 where a clean presenter audio is transmitted to the rest of the group of participants at the conference call.

In the example of FIG. 3, the system 300 also supports canceling conference audio from computer audio. While the system 300 depicted in FIG. 3 is in operation, the computer audio capturing component 114 of the computer audio engine 111 captures separately both the mix of the computer audio and the conference audio of (rest of the group of the participants at) the conference call from output of the sound mixing component 112 as well as the conference audio alone from the receiving component 108 of the voice audio engine 104. The computer audio capturing component 114 then cancels the conference audio from the mix of the conference audio and the computer audio so that a clean computer audio stream is transmitted to the conference call. Here, the computer audio stream can be transmitted either via a separate conference channel to the viewer or alternatively through the same voice conference bridge 118 shown by the dotted arrow in FIG. 3 together with the presenter audio.

Figure 5:
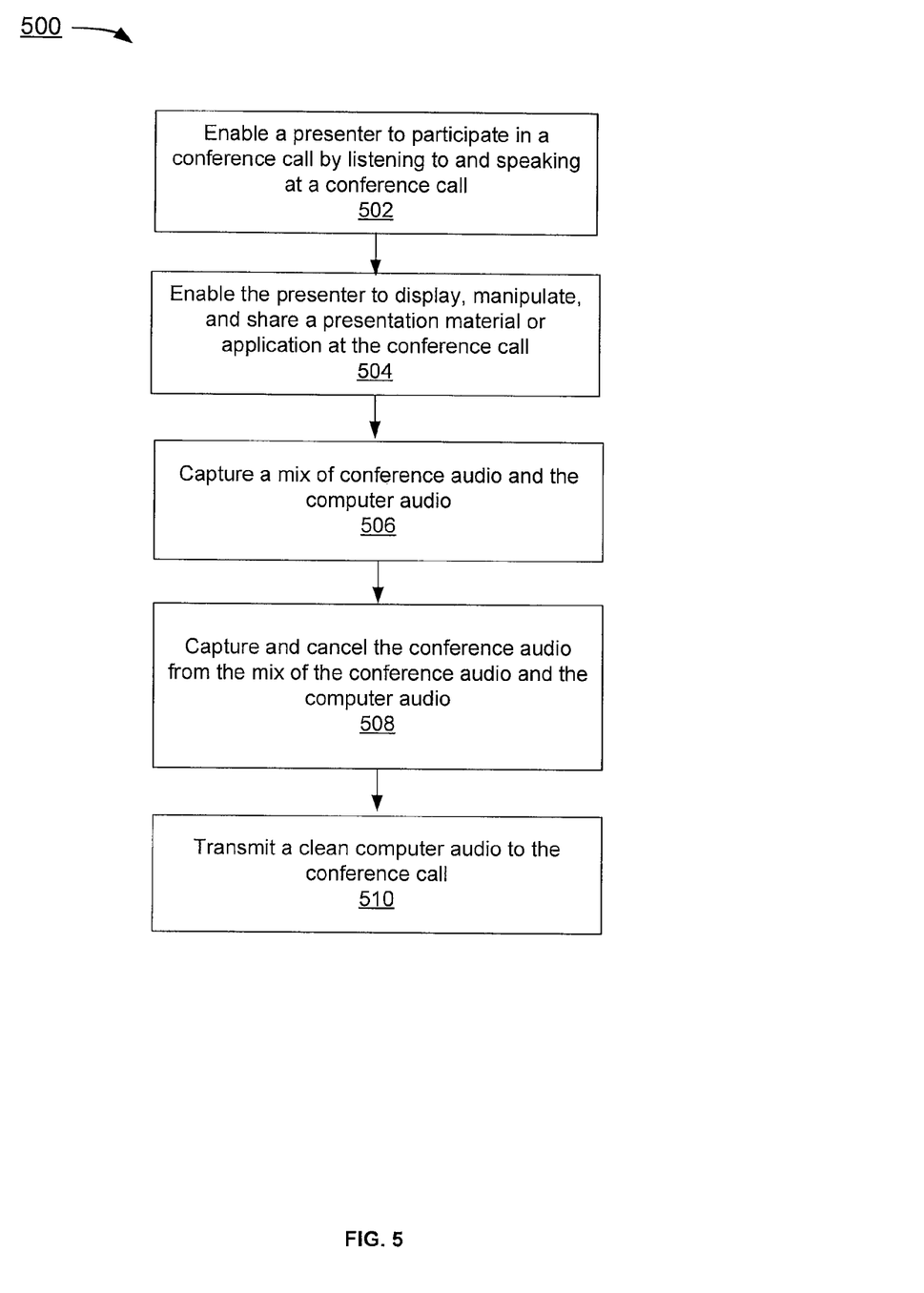
FIG. 5 depicts a flowchart of an example of a process to support canceling voice conference audio from computer audio of a presenter conferencing through a hosting device.

FIG. 5 depicts a flowchart of an example of a process to support canceling conference audio from computer audio of a presenter conferencing through a (VoIP) hosting device. In the example of FIG. 5, the flowchart 500 starts at block 502 where a presenter is enabled to participate in a conference call by listening to and speaking at the conference call. The flowchart 500 continues to block 504 where the presenter is enabled to display, manipulate, and share a presentation material or application at the conference call. The flowchart 500 continues to block 506 where a mix of the conference audio and the computer audio is captured. The flowchart 500 continues to block 508 where the conference audio is separately captured and canceled from the mix of the conference audio and the computer audio. The flowchart 500 ends at block 510 where a clean computer audio is transmitted to the conference call.

VoIP Conferencing—Viewer Side

FIG. 6(a)-(c) depict various examples of diagrams of a system 600 on the viewer side of FIG. 1 to support canceling computer audio from voice audio of a viewer conferencing through a (VoIP) hosting device, where FIGS. 6(a)-(b) further include a computer audio playback component 116 within the computer audio engine 111 for playing back any audio stream accepted from an audio source or input device. Although some components in the figures are similar to those depicted in FIG. 3, the functionalities they perform and the connections among them may vary.

In the example of FIG. 6(a)-(b), the computer audio playback component 116 of the computer audio engine 111 is a software component that accepts audio streams from input to the host 102, process the accepted audio streams, and provides them to other components running on the host 102, such as the receiving component 108 of the voice audio engine 106 and/or the sound mixing component 112, for further processing or output to speakers associated with the host 102.

While the system 600 depicted in FIG. 6(a) is in operation, the voice audio engine 104 running on the host 102 enables a viewer to listen to a conference call hosted by a voice conference bridge 118 via one or more speakers (so that other people at the same location can listen in) and speaks to the conference call via a microphone. The display component 110 of the host 102 optionally receives and displays a presentation material or an application originated by a presenter at the conference call to the viewer. During the conference call, the computer audio playback component 116 of the computer audio engine 111 accepts a computer audio stream of the presentation material or application transmitted from another host 102 (such as the host associated with the presenter) and provides it to the sound mixing component 112 of the host 102. The sound mixing component 112 captures and mixes both the computer audio and the conference audio received from the receiving component 108 of the voice audio engine 104, which accepts and outputs the conference audio stream from the voice conference bridge 118 hosting the conference call. The sound mixing component 112 then outputs the mix of the conference audio and the computer audio to the speaker(s) so that the viewer can listen to the rest of the group of the participants at the conference call. In addition, the sound mixing component 112 also provides the mix of conference audio and the computer audio to the transmitting component 106 of the voice audio engine 104 for processing of the audio streams captured from the microphone. The transmitting component 106 captures via the microphone not only a voice audio stream of the viewer but also the mix of the conference audio and the computer audio leaked through the microphone from the speaker. The transmitting component 106 then captures from output of the sound mixing component 112 the mix of the conference audio and the computer audio and cancels the mix from the one or more audio streams captured by the microphone so that a clean viewer audio will be transmitted to the voice conference bridge 118 hosting the conference call without the feedback noise of the leaked conference audio and/or the computer audio.

Figure 6:
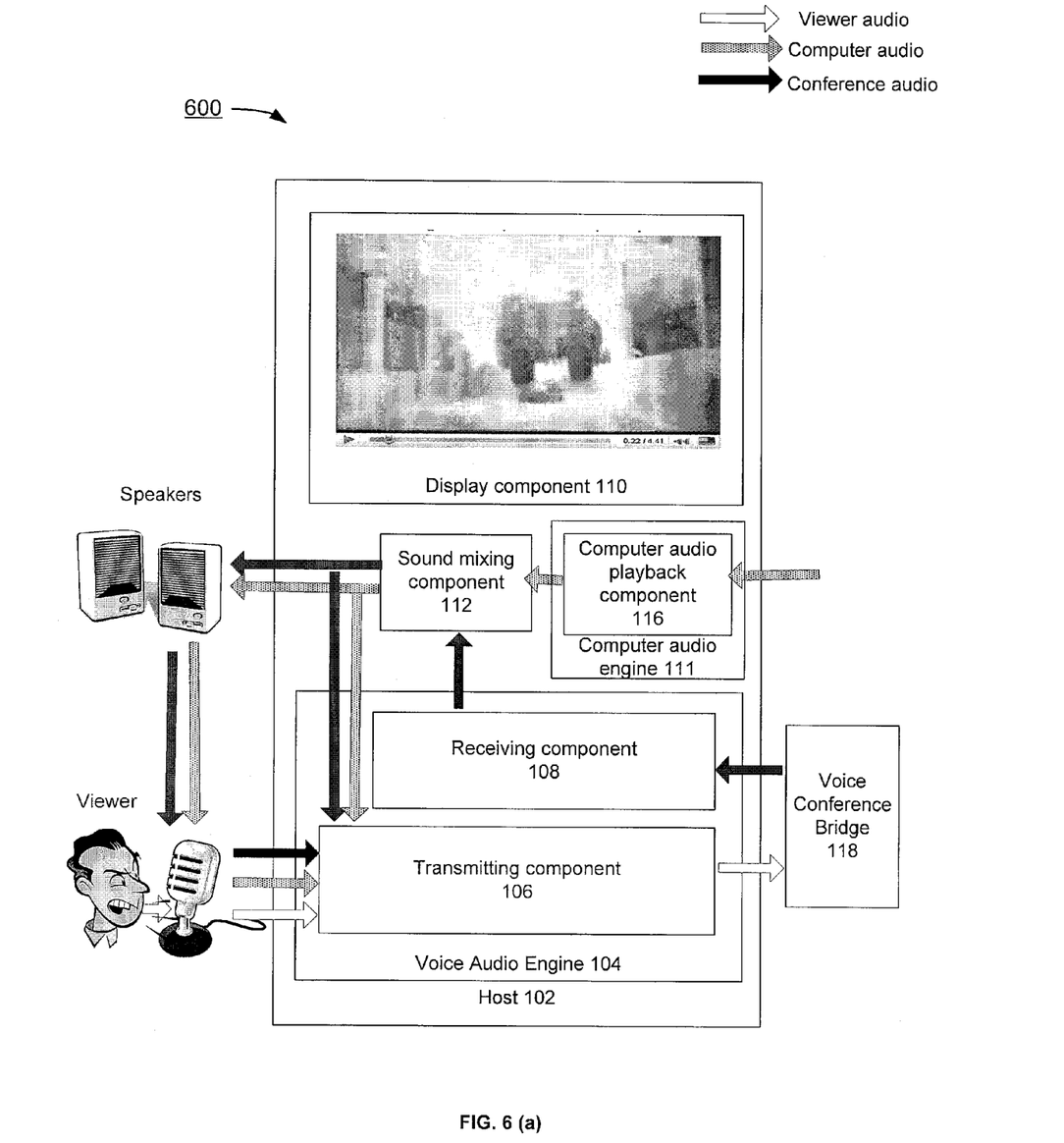

In an alternative embodiment, while the system 600 depicted in FIG. 6(*b*) is in operation, the computer audio playback component 116 of the computer audio engine 111 receives the computer audio transmitted from another host. Instead of providing the captured computer audio stream to the sound mixing component 112 of the host 102 as in FIG. 6(*a*), however, the computer audio playback component 116 provides the captured computer audio stream to the receiving component 108 of the voice audio engine 104 instead. The receiving component 108 of the voice audio engine 104 then accepts and mixes both the computer audio and the voice conference audio, and outputs the mix of the two audio streams to the sound mixing component 112. The sound mixing component 112 then captures and outputs the mix of the conference audio and the computer audio to the speaker for the viewer to listen to. The remaining part of the FIG. 6(*b*) functions analogously to FIG. 6(*a*).

In another alternative embodiment, the system 600 depicted in FIG. 6(*c*) functions when the computer audio from the host associated with the presenter is transmitted through the voice conference engine 118 as shown by the dotted arrow from 114 to 118 in FIG. 3. Accordingly, while the system 600 depicted in FIG. 6(*c*) is in operation, the computer audio stream is transmitted through the voice conference bridge 118 to the receiving component 108 of the voice audio engine 104, together with the audio stream of the conference call, instead of being transmitted and captured separately by the computer audio playback component 116 as in FIGS. 6(*a*) and 6(*b*). The receiving component 108 then accepts and outputs the mix of the two audio streams to the sound mixing component 112. The sound mixing component 112 then captures and outputs the mix of the conference audio and the computer audio to the speaker for the viewer to listen to. The remaining part of the FIG. 6(*c*) functions analogously to FIGS. 6(*a*) and 6(*b*).

Figure 7:
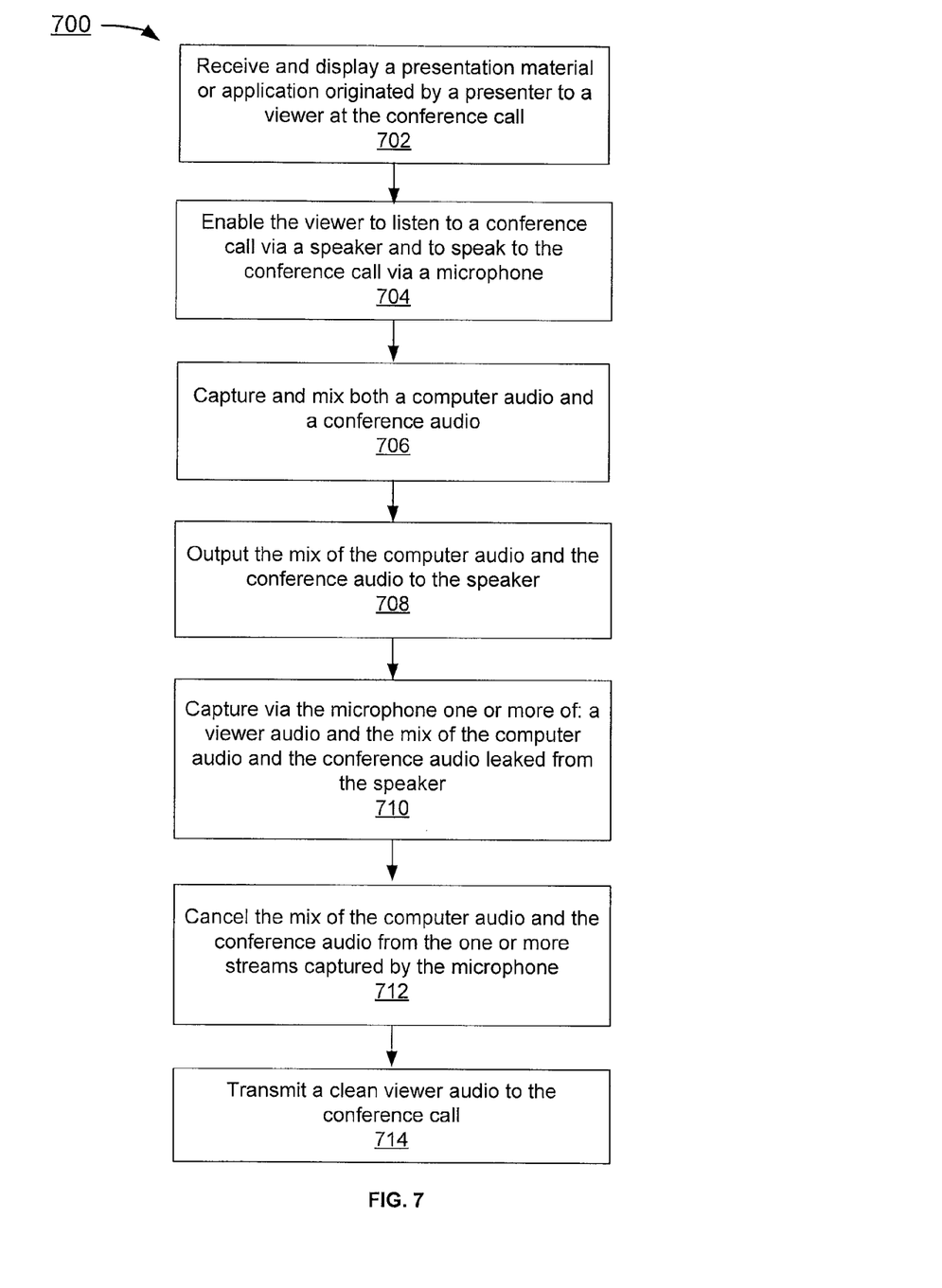
FIG. 7 depicts a flowchart of an example of a process to support canceling computer audio from voice conference audio of a viewer conferencing through a hosting device in accordance with FIG. 6($a$).

FIG. 7 depicts a flowchart of an example of a process to support canceling computer audio from voice audio of a viewer conferencing through a (VoIP) hosting device in accordance with FIG. 6(*a*). In the example of FIG. 7, the flowchart 700 starts at block 702 where a presentation material or an application originated by a presenter is received and optionally displayed to a viewer at the conference call via the hosting device. The flowchart 700 continues to block 704 where the viewer is enabled to participate in the conference call by listening to the conference call via a speaker and speaking to the conference call via a microphone. The flowchart 700 continues to block 706 where both a computer audio and conference audio are captured and mixed. The flowchart 700 continues to block 708 where the mix of the conference audio and the computer audio is output to the speaker for the viewer to listen to. The flowchart 700 continues to block 710 where one or more of: a viewer audio and the mix of the conference audio and the computer audio leaked from the speaker are captured via the microphone. The flowchart 700 continues to block 712 where the mix of the conference audio and the computer audio leaked through the microphone is canceled from the one or more audio streams captured. The flowchart 700 ends at block 714 where a clean viewer audio is transmitted to the conference call.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more hosts to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human viewer or other mechanism utilizing the results of the present invention. Such software may include, but is not limited to, device drivers, operating systems, execution environments/containers, and applications.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:
1. A system, comprising:
 a first host computer system associated with a presenter, which in operation, runs an application or a presentation material that outputs audio;
 a first computer audio engine executing on the first host, which in operation, transmits a clean outgoing audio stream generated by the application or the presentation material running on the first host computer system;
 a first voice audio engine running on the first host, which in operation, enables the presenter to listen to an audio stream from a viewer microphone and to speak an audio stream into a presenter microphone at a conference call and transmits a clean outgoing presenter audio stream to a voice conference bridge hosting the conference call by cancelling, using a sound mixing component, from the outgoing presenter audio stream the audio stream from the viewer and the application or the presentation material outgoing audio stream, the sound mixing component combining, using application programming interfaces for processing voice audio streams, the outgoing presenter audio stream, the audio stream from the viewer, and the application or the presentation material outgoing audio stream in order to generate the clean outgoing presenter audio stream;
 a second host computer system associated with the viewer;

a second computer audio engine executing on the second host, which in operation, accepts the incoming audio stream generated by the application or the presentation material running on the first host computer system;
a second voice audio engine running on the second host, which in operation, enables the viewer to listen to the presenter audio stream and to speak an audio stream into the viewer microphone at the conference call and transmits a clean outgoing viewer audio stream to the voice conference bridge hosting the conference call by cancelling from the outgoing viewer audio stream the presenter audio stream and the application or the presentation materials outgoing audio stream; and
the voice conference bridge, which in operation, accepts and transmits the audio streams between the presenter and the viewer at the conference call, wherein the first voice audio engine communicates with the second voice audio engine via the voice conference bridge, and wherein the first computer audio engine communicates with the second computer audio engine without accessing the voice conference bridge.

2. The system of claim 1, further comprising:
a first display component of the first host, which in operation enables the presenter to display, manipulate, and share the application or the presentation material;
a second display component of the second host, which in operation receives and displays the application or the presentation material originated by the presenter to the viewer at the conference call.

3. The system of claim 1, wherein:
each of the first and the second host is a computing device, a communication device, a storage device, or any electronic device capable of running a software component.

4. The system of claim 1, wherein:
each of the first and the second voice audio engines enable each of the presenter and the viewer to listen to the conference call via a speaker.

5. A non-transitory computer-readable medium comprising instructions which, when executed by one or more computers, cause the one or more computers to implement a method, the method comprising:
running, at a first host computer system associated with a presenter, an application or a presentation material that outputs audio;
transmitting, from a first computer audio engine executing on the first host, a clean outgoing audio stream generated by the application or the presentation material running on the first host computer system;
enabling, via a first voice audio engine running on the first host, the presenter to listen to an audio stream from a viewer microphone and to speak an audio stream into a presenter microphone at a conference call and transmits a clean outgoing presenter audio stream to a voice conference bridge hosting the conference call by cancelling, using a sound mixing component, from the outgoing presenter audio stream the audio stream from the viewer and the application or the presentation material outgoing audio stream, the sound mixing component combining, using application programming interfaces for processing voice audio streams, the outgoing presenter audio stream, the audio stream from the viewer, and the application or the presentation material outgoing audio stream in order to generate the clean outgoing presenter audio stream;
accepting, at a second computer audio engine executing on a second host computer system associated with the viewer, the incoming audio stream generated by the application or the presentation material running on the first host computer system;
enabling, via a second voice audio engine running on the second host, the viewer to listen to the presenter audio stream and to speak an audio stream into the viewer microphone at the conference call and transmits a clean outgoing viewer audio stream to the voice conference bridge hosting the conference call by cancelling from the outgoing viewer audio stream the presenter audio stream and the application or the presentation materials outgoing audio stream; and
accepting and transmitting, via the voice conference bridge, the audio streams between the presenter and the viewer at the conference call, wherein the first voice audio engine communicates with the second voice audio engine via the voice conference bridge, and wherein the first computer audio engine communicates with the second computer audio engine without accessing the voice conference bridge.

6. The non-transitory computer-readable medium of claim 5, the method further comprising:
enabling, via a first display component of the first host, the presenter to display, manipulate, and share the application or the presentation material;
receiving and displaying, at a second display component of the second host, the application or the presentation material originated by the presenter to the viewer at the conference call.

7. The non-transitory computer-readable medium of claim 5, wherein:
each of the first and the second host is a computing device, a communication device, a storage device, or any electronic device capable of running a software component.

8. The non-transitory computer-readable medium of claim 5,
wherein:
each of the first and the second voice audio engines enable each of the presenter and the viewer to listen to the conference call via a speaker.

9. A computer-implemented method comprising:
running, at a first host computer system associated with a presenter, an application or a presentation material that outputs audio;
transmitting, from a first computer audio engine executing on the first host, a clean outgoing audio stream generated by the application or the presentation material running on the first host computer system;
enabling, via a first voice audio engine running on the first host, the presenter to listen to an audio stream from a viewer microphone and to speak an audio stream into a presenter microphone at a conference call and transmits a clean outgoing presenter audio stream to a voice conference bridge hosting the conference call by cancelling, using a sound mixing component, from the outgoing presenter audio stream the audio stream from the viewer and the application or the presentation material outgoing audio stream, the sound mixing component combining, using application programming interfaces for processing voice audio streams, the outgoing presenter audio stream, the audio stream from the viewer, and the application or the presentation material outgoing audio stream in order to generate the clean outgoing presenter audio stream;
accepting, at a second computer audio engine executing on a second host computer system associated with the viewer, the incoming audio stream generated by the application or the presentation material running on the first host computer system;

enabling, via a second voice audio engine running on the second host, the viewer to listen to the presenter audio stream and to speak an audio stream into the viewer microphone at the conference call and transmits a clean outgoing viewer audio stream to the voice conference bridge hosting the conference call by cancelling from the outgoing viewer audio stream the presenter audio stream and the application or the presentation materials outgoing audio stream; and accepting and transmitting, via the voice conference bridge, the audio streams between the presenter and the viewer at the conference call, wherein the first voice audio engine communicates with the second voice audio engine via the voice conference bridge, and wherein the first computer audio engine communicates with the second computer audio engine without accessing the voice conference bridge.

10. The method of claim 9, further comprising:

enabling, via a first display component of the first host, the presenter to display, manipulate, and share the application or the presentation material;

receiving and displaying, at a second display component of the second host, the application or the presentation material originated by the presenter to the viewer at the conference call.

11. The method of claim 9, wherein:

each of the first and the second host is a computing device, a communication device, a storage device, or any electronic device capable of running a software component.

12. The method of claim 9, wherein:

each of the first and the second voice audio engines enable each of the presenter and the viewer to listen to the conference call via a speaker.

* * * * *